United States Patent
Bhatia et al.

(10) Patent No.: US 11,342,946 B1
(45) Date of Patent: May 24, 2022

(54) NEURAL NETWORK KERNELS FOR SIGNAL PROCESSING IN LIEU OF DIGITAL SIGNAL PROCESSING IN RADIO RECEIVERS

(71) Applicant: BAE SYSTEMS Information and Electronic Systems Integration Inc., Nashua, NH (US)

(72) Inventors: Amit Bhatia, Apex, NC (US); Joseph M. Carmack, Milford, NH (US); Scott A Kuzdeba, Hollis, NH (US); Joshua W. Robinson, Durham, NC (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 17/208,304

(22) Filed: Mar. 22, 2021

(51) Int. Cl.
*H04B 1/00* (2006.01)
*G06N 3/04* (2006.01)
*H04B 1/10* (2006.01)

(52) U.S. Cl.
CPC ............. *H04B 1/0014* (2013.01); *G06N 3/04* (2013.01); *H04B 1/1036* (2013.01)

(58) Field of Classification Search
CPC .......................... H04B 1/0014; H04B 1/1036
See application file for complete search history.

(56) References Cited

U.S. PATENT DOCUMENTS

| | | | |
|---|---|---|---|
| 2010/0199257 A1* | 8/2010 | Biggerstaff | G06F 8/456 717/110 |
| 2016/0072592 A1* | 3/2016 | Tu | H04B 1/406 375/219 |
| 2019/0087529 A1* | 3/2019 | Steingrimsson | G06F 30/27 |
| 2019/0319659 A1* | 10/2019 | Calabro | G06N 3/08 |
| 2021/0012541 A1* | 1/2021 | Lee | G06T 11/005 |
| 2021/0399749 A1* | 12/2021 | Dautriche | H04B 1/0007 |

OTHER PUBLICATIONS

Robinson, Josh et al. "Dilated Causal Convolutional Model For RF Fingerprinting", BAE Systems, FAST Labs. Durham, NC and Burlington, MA, USA. Jan. 2020.

(Continued)

*Primary Examiner* — Jaison Joseph
(74) *Attorney, Agent, or Firm* — Maine Cernota & Rardin (57) ABSTRACT

An artifact-suppressing neural network (NN) kernel comprising at least one neural network, implemented in replacement of a DSP, provides comparable or better performance under non-edge conditions, and superior performance under edge conditions, due to the ease of updating the NN kernel training without enlarging its computational footprint or latency to address a new edge condition. In embodiments, the NN kernel can be implemented in a field programmable gate array (FPGA) or application specific integrated circuit (ASIC), which can be configured as a direct DSP replacement. In various embodiments, the NN kernel training can be updated in near real time when a new edge condition is encountered in the field. The NN kernel can include DCC lower layers and dense upper layers. Initial NN kernel training can require fewer examples. Example embodiments include a noise suppression NN kernel and a modem NN kernel.

23 Claims, 9 Drawing Sheets

(56) References Cited

OTHER PUBLICATIONS

Robinson, Josh & Kuzdeba, Scott. "MarconiNet: Radio Frequency Classification for Large Populations", BAE Systems, FAST Labs. Merrimack, NH, USA. Jan. 2021.
Robinson, Josh & Kuzdeba, Scott. "Novel Device Detection Using RF Fingerprints", BAE Systems, FAST Labs. Merrimack, NH, USA. Jan. 2021.
Kuzdeba, Scott, et al. "Transfer Learning With Radio Frequency Signals", BAE Systems, FAST Labs. Merrimack, NH, USA. Jan. 2021.
Stankowicz, James & Kuzdeba, Scott. "Unsupervised Signal Clustering Through Deep Manifold Learning", BAE Systems, FAST Labs. Burlington, MA, USA. Jan. 2021.
Oord, Aaron Van Den, et al. "WaveNet: A Generative Model for Raw Audio", Google DeepMind, London, UK. Sep. 19, 2016.
O'Shea T. & Hoydis J. "An introduction to deep learning for the physical layer," IEEE Transactions on Cognitive Communications and Networking, vol. 3, No. 4, pp. 563-575, 2017.
Wong, L.J. et al. "The rfml ecosystem: A look at the unique challenges of applying deep learning to radio frequency applications," arXiv preprint arXiv:2010.00432, 2020.

Dorner, S. et al. "Deep learning based communication over the air," IEEE Journal of Selected Topics in Signal Processing, vol. 12, No. 1, pp. 132-143, 2017.
Ye, Hao et al. "Channel agnostic end-to-end learning based communication systems with conditional gan," in 2018 IEEE Globecom Workshops (GC Wkshps). IEEE, 2018, pp. 1-5.
Engel, J. et al "DDSP: Differentiable digital signal processing," arXiv preprint arXiv:2001.04643, 2020.
Mun, J. et al. "A deep learning approach for automotive radar interference mitigation," in 2018 IEEE 88th Vehicular Technology Conference (VTC-Fall). IEEE, 2018, pp. 1-5.
Zhou, Y. et al. "Deep learning interference cancellation in wireless networks," arXiv preprint arXiv:2009.05533, 2020.
Ninkovic, V. et al. "Deep learning based packet detection and carrier frequency offset estimation in IEEE 802.11 ah," arXiv preprint arXiv:2004.11716, 2020.
Dreifuerst, R. et al. "Deep learning-based carrier frequency offset estimation with one-bit adcs," in 2020 IEEE 21st International Workshop on Signal Processing Advances in Wireless Communications (SPAWC). IEEE, 2020, pp. 1-5.

* cited by examiner

NEURAL NETWORK KERNELS FOR SIGNAL PROCESSING IN LIEU OF DIGITAL SIGNAL PROCESSING IN RADIO RECEIVERS

STATEMENT OF GOVERNMENT INTEREST

The present invention was made under Contract No. HR00112090053 awarded by the Defense Advanced Research Projects Agency (DARPA), and the United States Government has certain rights in this invention.

FIELD

The disclosure relates to radio receivers, and more particularly to artifact suppression in radio receivers.

BACKGROUND

In many applications it is necessary for a radio receiver to apply one or more processing steps to a received message signal so as to estimate and compensate for performance degrading artifacts, and thereby improve the accuracy and reliability of the message reception. Typical signal artifacts can include time and frequency shifts, "tone" interference, and "multipath" artifacts. If not adequately estimated and compensated, these artifacts can lead to degraded performance, including an increased Bit Error Rate (BER) in the wireless communication.

Timing offsets can arise due to symbol timing and/or sampling clock drift in the transmitter and/or receiver, and frequency offsets can arise due to differences between transmitter and receiver oscillators as well as due to Doppler shifts arising from relative motion between the transmitter and receiver.

Tone interference arises when a radio signal transmitted by an undesired transmitting source is detected by the radio receiver at a frequency that is identical or close to the message transmission frequency. This circumstance can arise due to many causes, including unintentional RF "leakage" from an electronic device or inaccurate frequency calibration of a second transmitter that has "drifted" into the frequency band of the desired message. Tone interference can also arise due to intentional, malicious "jamming" by an adversary. In the simplest case, tone interference may appear as single frequency, unmodulated signal or "tone." This is a common situation, because many unintended sources of tone interference naturally generate interference at a single frequency. In addition, many jamming interference sources transmit their interference on a single frequency, because the sensitivity of the receiver to jamming interference will be greatest if all of the energy of the jamming signal is concentrated at one frequency. However, in general tone interference may be present at a plurality of frequencies, and/or may be modulated.

Multipath artifacts arise due to the tendency for a radio signal to be reflected or refracted by elements of the environment, and to thereby find its way from the sender to the receiver via a plurality of different paths having differing path lengths. Causes of multipath artifacts can include atmospheric ducting, ionospheric reflection and refraction, and reflection of radio waves from water bodies and terrestrial objects such as mountains and buildings. Multipath artifacts can result in multiple "copies" of the signal being received at different times and with different frequencies and/or different RF phases, which can lead to destructive interference between the received "copies" of the signal and a resultant "fading" of the received signal.

These artifacts can be especially harmful when using a wireless communication protocol, such as Long-Term Evolution (LTE) and/or Orthogonal Frequency Division Multiplexing (OFDM), that transmits each message as a series of amplitude and phase encoded (IQ) symbols, and seeks to enhance the performance and reduce the Inter-Symbol Interference (ISI) at enhanced data rates in wireless communications.

The requirement to apply artifact compensating signal processing to a received radio signal is common to a variety of different radio applications, ranging from cellular telephone communication to wireless communications between military aircraft and operational control centers. For many of these types of radio receivers, the signal processing steps are performed by Digital Signal Processing "kernels" (DSPs) included in the radio receiver, where each of the DSPs is pre-programmed to efficiently perform a specific signal processing step.

For example, a DSP that is responsible for suppressing tone noise may be pre-programmed to sample the incoming signal, perform a Fourier Transform, "peak-pick" to determine the peak frequency at which the received signal is strongest, compare the signal strength at the peak frequency with an average signal strength across the bandwidth of the received message, and then interpose a notch filter at the peak frequency.

Generally, the algorithms that are pre-programmed into the artifact-suppressing DSPs of a wireless radio receiver are designed according to certain assumptions regarding artifacts that may be encountered under expected operating conditions, such as an assumption that tone interference will be limited to a single RF frequency and will be stronger than the average power of the received message, or an assumption that all signal frequency offsets will be less than 200 Hz. An "edge condition" can be encountered if the operating conditions exceed or diverge from the design expectations, for example due to novel or altered use of the radio beyond what it was designed for, or due to shifts in the environment or other devices operating in the same area that were not considered during design. When an "edge condition" artifact is encountered, the ability of the corresponding DSP to compensate for an artifact can be greatly diminished.

Figure 1:
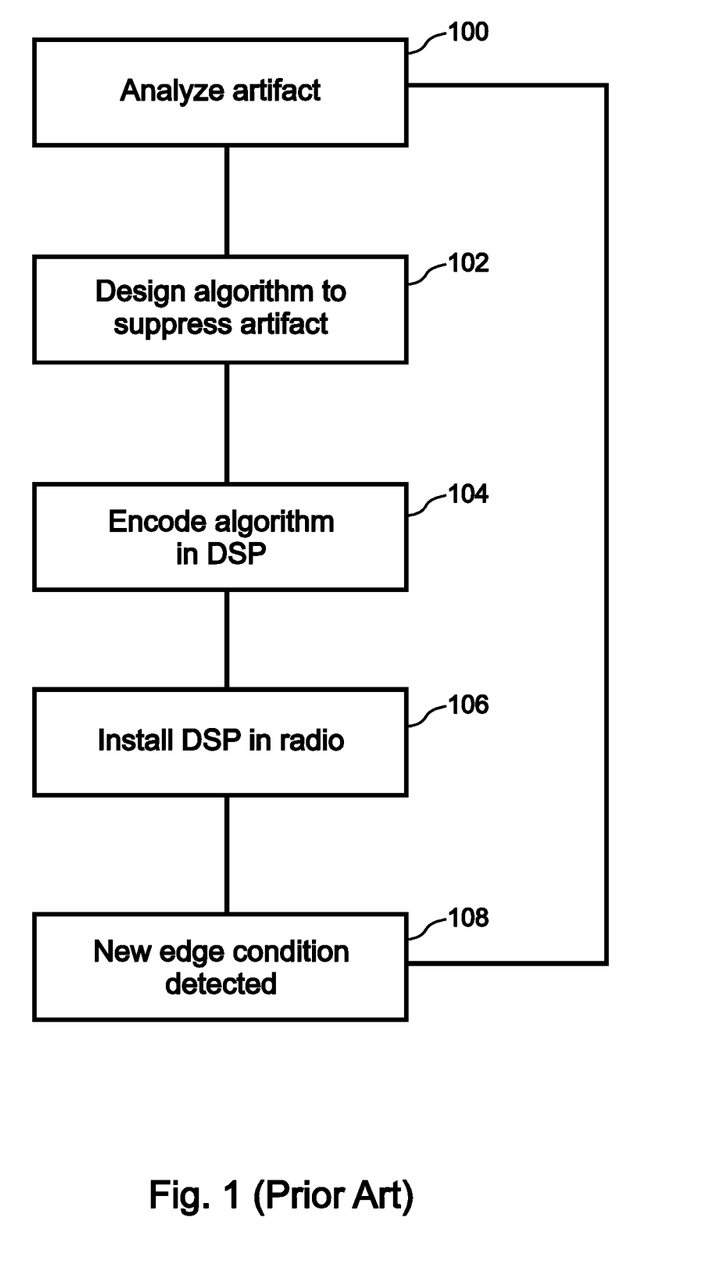
FIG. 1 is a flow diagram that illustrates a method of responding to an edge condition according to the prior art.

With reference to FIG. 1, implementing an artifact-suppressing DSP in a radio requires that the artifact be analyzed 100, typically under non-edge conditions, and that a suitable suppression algorithm be designed 102. These steps are typically performed by highly trained engineers or technicians. The new algorithm is then encoded into a DSP 104, and the DSP is installed in the radio 106. If a new edge condition is encountered, 108, it becomes necessary to repeat the entire design process under assumptions that take account of the new edge condition. This can be a time-consuming and expensive process.

Accordingly, when an edge condition is first encountered, for example a novel multi-tone jamming signal encountered during a military operation, there is no opportunity to modify and adapt an artifact-suppressing DSP to the edge condition in "real time," i.e. while the military operation is in progress, or the interference from the newly encountered edge condition otherwise continues to persist.

What is needed, therefore, is an artifact-suppressing solution for a wireless radio that can be easily and rapidly optimized to suppress a newly encountered edge condition, preferably in real time as the new edge condition is first being encountered.

SUMMARY

The present disclosure is an artifact-suppressing Neural Network (NN) kernel that at least functionally replaces an artifact-suppressing DSP in a radio receiver. In some embodiments, the NN kernel is implemented on a Field Programmable Gate Array (FPGA) or an Application Specific Integrated Circuit (ASIC), and in various embodiments the NN kernel can be physically installed in the radio receiver in direct replacement of the DSP.

After establishing the neural network architecture of the NN kernel, it is trained using either measured or theoretically generated, physics-based examples of the artifact according to non-edge conditions, or possibly including previously characterized edge conditions. Theoretical training examples can be generated using one or more neural networks, for example using a Generative Adversarial Network "GAN." Initial training using theoretically generated, physics-based examples is used in some embodiments because this approach allows the training examples to include only the type of artifact that the NN kernel will be responsible for suppressing.

In embodiments, training of the NN kernel using fewer than 2500 examples, and in embodiments using only 2000 examples is sufficient to achieve NN kernel performance for non-edge conditions that equals or exceeds the performance of a typical DSP that performs the same function. In various embodiments, the computational complexity and floating-point precision of the NN kernel are compatible for inclusion of the NN kernel in an FPGA or ASIC that can directly replace the DSP. In embodiments improved performance of the NN kernel is achieved even for non-edge conditions because the artifact suppression of the NN kernel is not based on an approximate, theoretical model of the artifact, but instead is optimized using realistic examples of the artifact. The NN kernel is thereby able to take into account nuances and subtle features of the artifact that may not even be known to the designers of the DSP, nor to the designers of the NN kernel.

Once the NN kernel has been initially trained to suppress an artifact under non-edge conditions, and possibly also under one or more known edge conditions, the NN kernel can be easily and quickly re-optimized for artifact suppression under a newly-encountered edge condition, without increasing the computational size, footprint, or latency of the NN kernel, simply by performing additional training of the NN kernel using examples of the artifact under the new edge condition. Because the additional training of the NN kernel represents only an adjustment to the previously learned solution, and is not a training "from scratch," the additional training requires fewer examples than the original training, and in embodiments can be performed using actual signals as received, rather than using theoretically generated examples.

In some embodiments, the NN kernel can be automatically adapted to a new edge condition, by using signals detected under the new edge condition as training examples to re-optimize the NN kernel in "real time," so that artifacts encountered under a new edge condition can be more effectively addressed.

In embodiments the NN kernel implements at least one Dilated Causal Convolutions (DCC) layer. In some of these embodiments, the number of DCC layers is sufficient to provide a receptive field that covers the length of an entire input sequence of message symbols. As will be understood by those of skill in the art, receptive fields apply to individual neurons in a neural network, where the receptive field of a neuron is the number of input samples that contribute to the calculation performed by the neuron. Typically, the receptive field will be the same for most or all of the neurons included in a given level of the neural network. In embodiments, the DCC layers as implemented in embodiments of the present disclosure are configured such that the receptive fields are increased in size for higher levels of the neural network, until a layer is reached where the entire input signal is processed, i.e., the outputs of the neurons in that layer include contributions from the entire signal, while the outputs of neurons in lower layers include contributions from only portions of the input. In various embodiments, the NN kernel further includes a plurality of "dense" layers.

One general aspect of the present disclosure is a method of enhancing the adaptability of a radio to suppress a target artifact that is present under a first novel edge condition in a signal received by the radio, wherein said signal carries a desired message to be decoded by the radio. The method includes implementing a neural network architecture comprising at least one neural network in a neural network kernel (NN kernel), preparing a plurality of training examples that include the target artifact under the first novel edge condition, training the neural networks of the NN kernel using the training examples, and implementing the NN kernel in the radio in replacement of a DSP of the radio that is configured to suppress the target artifact in the absence of the first novel edge condition, thereby causing the NN kernel to suppress the target artifact during operation of the radio under the first novel edge condition.

In embodiments, the neural network kernel architecture comprises at least one Dilated Causal Convolutions (DCC) layer. In some of these embodiments at least one of the DCC layers is a two-dimensional DCC layer. In any of these embodiments the neural network architecture can include sufficient DCC layers to provide a receptive field that covers a length of an entire input sequence of message symbols.

In any of the above embodiments, the neural network kernel architecture can include a plurality of dense layers.

In any of the above embodiments, the training examples can be artificially generated, and each of the training examples can include the target artifact as the only artifact of the training example.

In any of the above embodiments, the training examples can be artificially generated by a neural network. In some of these embodiments, the training examples are artificially generated by a Generative Adversarial Network (GAN.)

In any of the above embodiments, the training examples can include fewer than 2500 training examples.

In any of the above embodiments, the neural network kernel can be implemented in a field programmable gate array (FPGA) or an application specific integrated circuit (ASIC). In some of these embodiments, the FPGA or ASIC can be directly installed in the radio in replacement of the DSP.

In any of the above embodiments, the NN kernel can provide enhanced suppression of the target artifact as compared to the DSP under at least some non-edge conditions.

In any of the above embodiments, a computational size of the NN kernel can be approximately equal to a computational size of the DSP.

In any of the above embodiments, the method can further include, upon encountering the target artifact under a second novel edge condition, where the second novel edge condition was not included in the training examples that were used to train the neural networks of the NN kernel, generating a plurality of retraining examples that include the target artifact under the second edge condition, performing additional training of at least one of the neural networks in the NN kernel using the retraining examples, and upon completion of said additional training, deploying the NN kernel to suppress the target artifact under the second novel edge condition. In some of these embodiments adaptation of the DSP to the second novel edge condition would require increasing a computational size of the DSP, while said retraining does not require a computational size of the NN kernel to be increased.

In any of the above embodiments, suppression of the target artifact by the NN kernel can include application of a plurality of suppression steps. In some of these embodiments the neural network architecture comprises a plurality of neural networks, at least one of which is dedicated to one of the suppression steps.

In any of the above embodiments, the target artifact can include at least one of a time offset and a frequency offset of the signal received by the radio. In some of these embodiments the NN kernel comprises separate branches directed to correcting the time offset and the frequency offset.

In any of the above embodiments, the target artifact can be tone interference present in the signal received by the radio.

In any of the above embodiments, the desired message can be encoded in the received signal by a radio using Orthogonal Frequency Division Multiplexing (OFDM).

And in any of the above embodiments, suppression of the target artifact by the NN kernel can include estimating parameters of the target artifact, and then eliminating the target artifact from the received signal.

A second general aspect of the present disclosure is non-transient media containing instructions readable by a processor and configured to cause the processor to create a Neural Network kernel (NN kernel) operable in a radio to suppress a target artifact that is present in a signal received by the radio under a novel edge condition, wherein said signal carries a desired message to be decoded by the radio, the NN kernel being implemented in the radio in direct replacement of a target artifact suppressing digital signal processor.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present disclosure is an artifact-suppressing Neural Network (NN) kernel that at least functionally replaces an artifact-suppressing DSP in a radio receiver. In some embodiments, the NN kernel is implemented on a Field Programmable Gate Array (FPGA) or an Application Specific Integrated Circuit (ASIC), and in various embodiments the NN kernel can be physically installed in the radio receiver in direct replacement of the DSP.

Figure 2:
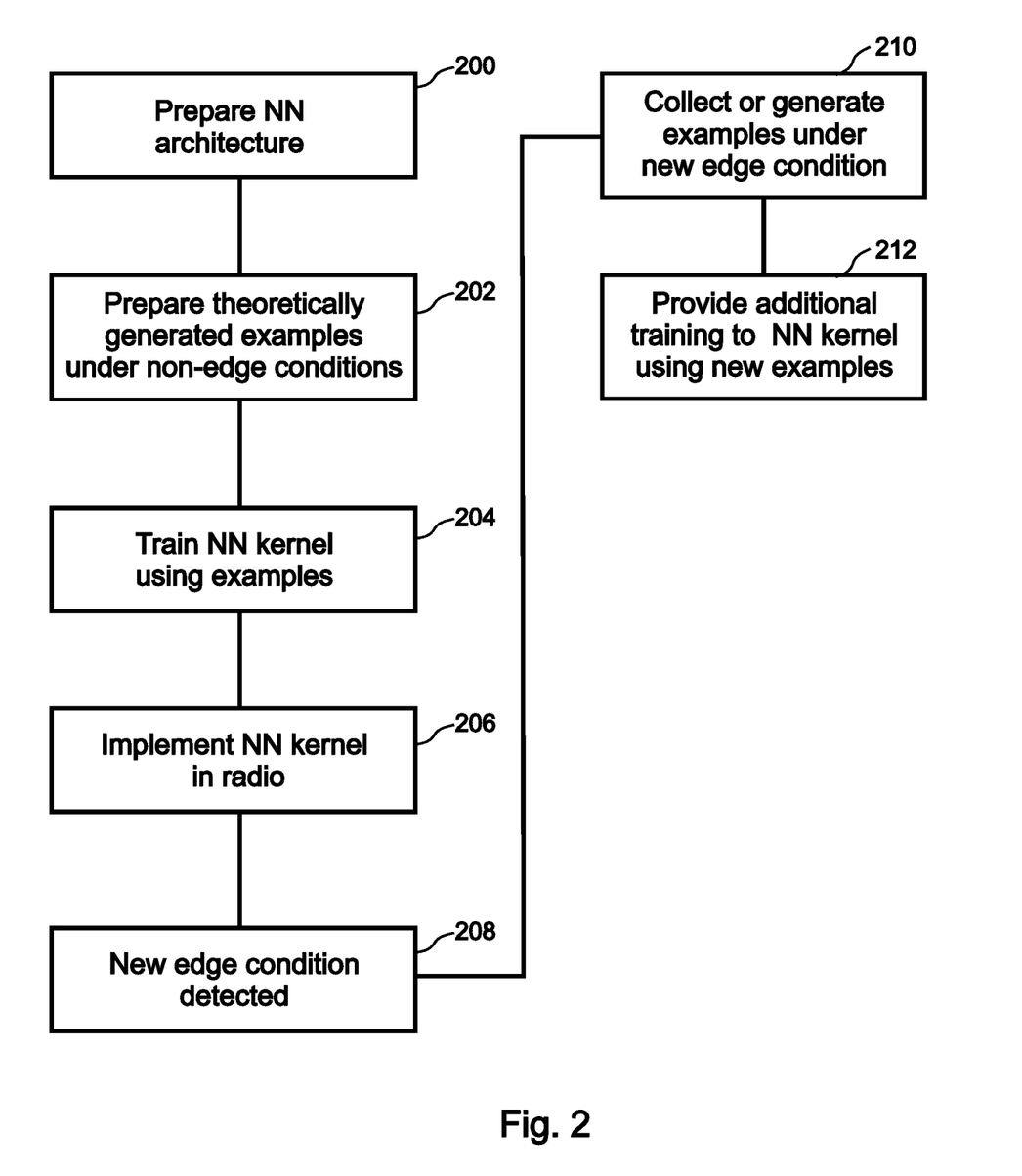
FIG. 2 is a flow diagram that illustrates a method of responding to an edge condition according to an embodiment of the present disclosure.

With reference to FIG. 2, after establishing the architecture of the NN kernel 200, a set of training examples is prepared 202 using either measured or theoretically generated, physics-based examples of the artifact according to non-edge conditions, or possibly including previously characterized edge conditions. Theoretically generated training examples can be generated using one or more neural networks, for example using a generative adversarial network "GAN." The training examples are then used to train the NN kernel 204, after which the NN kernel is implemented in the radio 206. For the initial training of the NN kernel 204, theoretically generated, physics-based examples 202 are used in some embodiments because this approach allows the training examples to include only the type of artifact that the NN kernel will be responsible for suppressing.

Figure 3A:
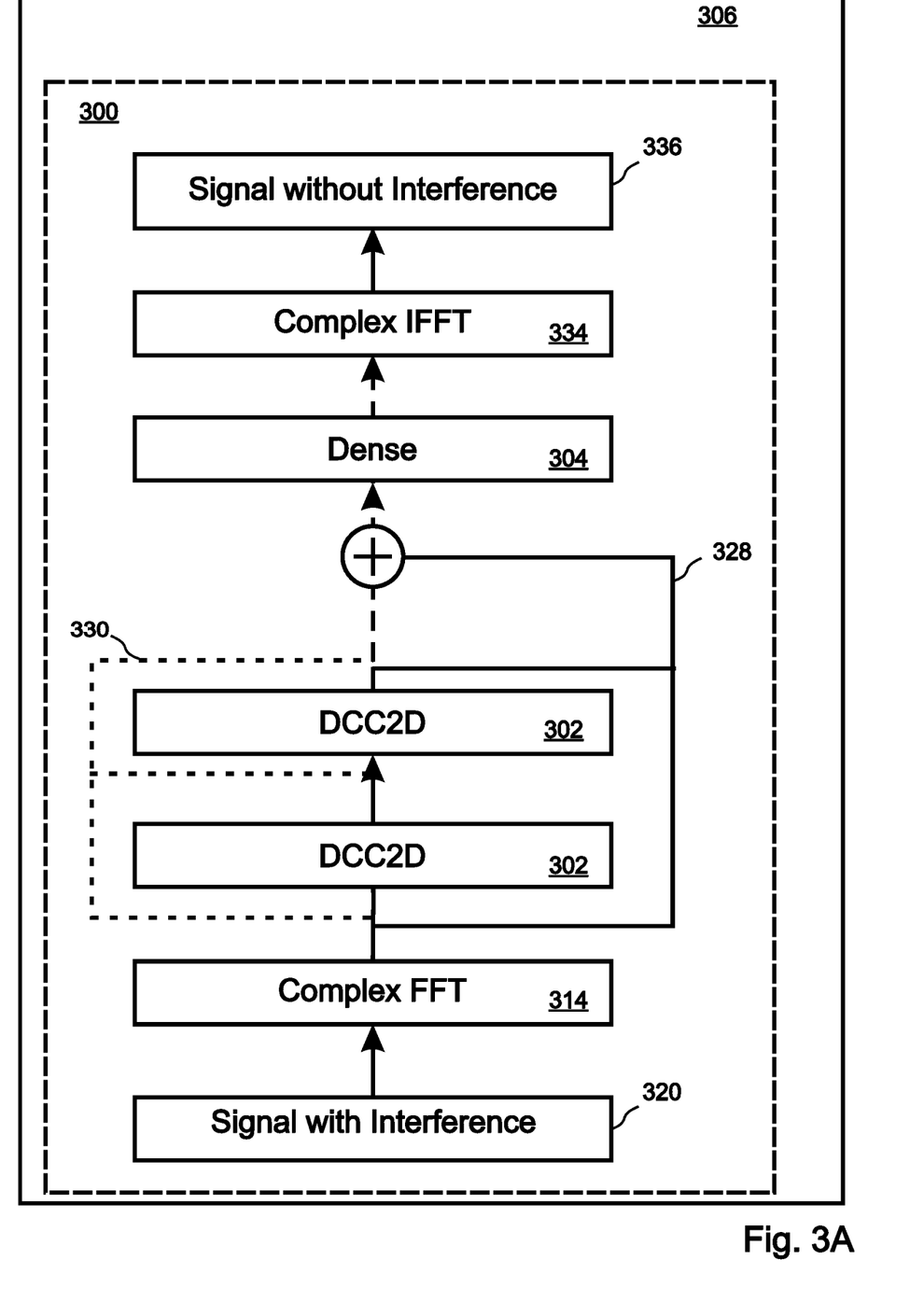
FIG. 3A is a flow diagram that illustrates the operation of a de-noise NN kernel according to an embodiment of the present disclosure.
Figure 3B:
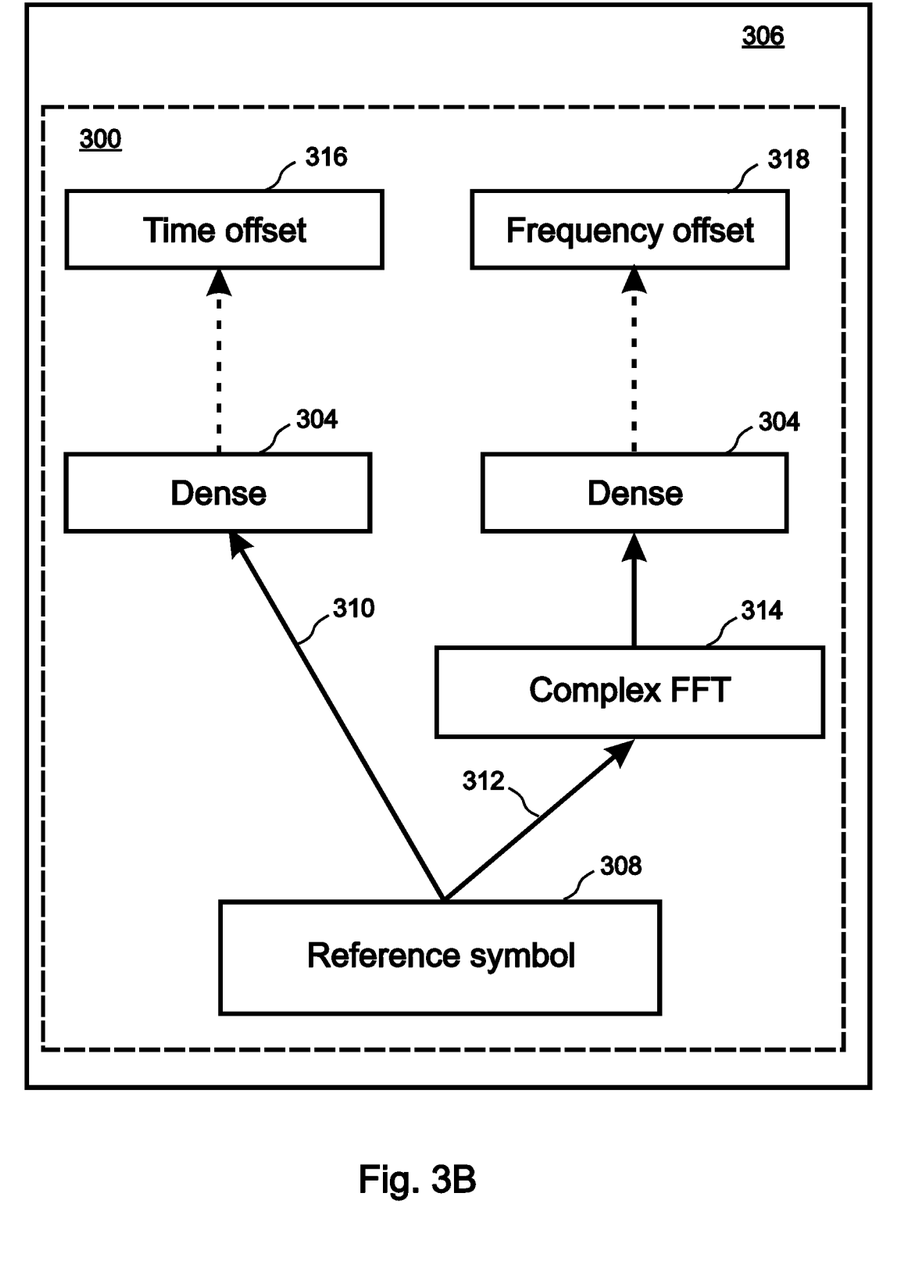
FIG. 3B is a flow diagram that illustrates the operation of a modem NN kernel according to an embodiment of the present disclosure.

With reference to FIG. 3A, in embodiments the architecture of the NN kernel 300 as implemented in a radio 306 includes at least one Dilated Causal Convolutions (DCC) NN layer 302 and a plurality of "dense" NN layers 304. In some of these embodiments, the number of DCC layers 302 is sufficient to provide a receptive field that covers the length of an entire input sequence of message symbols. In various embodiments, the computational complexity and floating-point precision of the NN kernel 300 are compatible for inclusion of the NN kernel 300 in an FPGA or ASIC that can directly replace the DSP. FIGS. 3A and 3B illustrate architecture features included in "de-noise" embodiments and "modem" embodiments respectively, as is discussed in more detail below.

Figure 4:
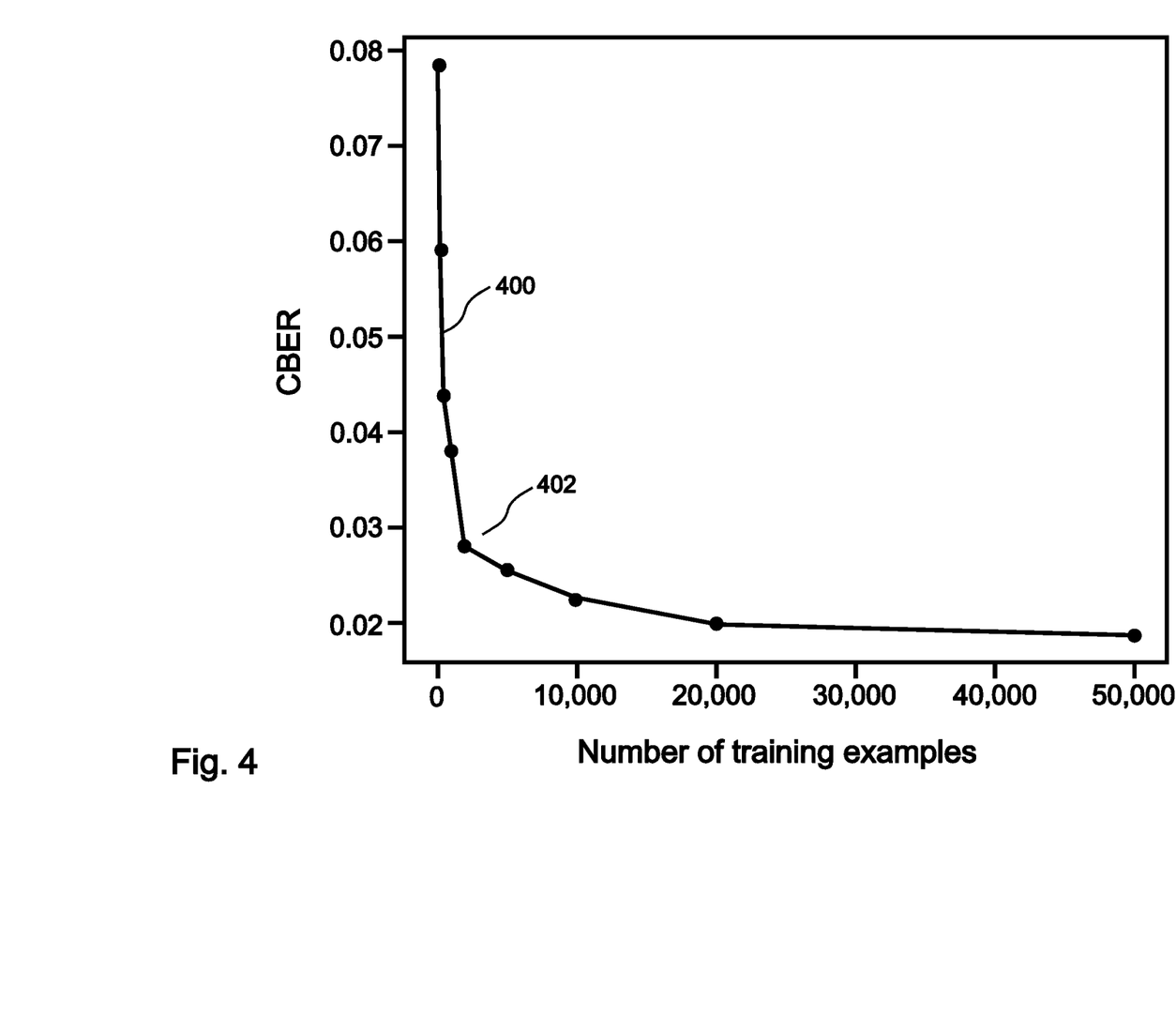
FIG. 4 is a graph that compares a reduction in channel bit error rate as a function of the number of examples that are used to train a NN kernel according to an embodiment of the present disclosure.

With reference to FIG. 4, in embodiments fewer than 2500 examples, and in embodiments only 2000 examples, provide sufficient training of the NN kernel to enable it to provide similar or better performance under non-edge conditions as compared to a DSP that is configured to suppress the same artifact. FIG. 4 is directed to a "de-noise" NN kernel 300 that is configured to suppress tone noise, and presents the reduction in the Channel Bit Error Rate (CBER) of the radio as a function of the number of examples used during training of the NN kernel under non-edge (single tone) conditions that include a Jamming-to-Signal Ratio (JSR) of 15. In FIG. 4, it can clearly be seen that an "elbow" 402 occurs in the CBER curve 400 at approximately 2000 examples, beyond which the further reduction of the CBER that is achieved by additional training of the NN kernel is modest.

With reference again to FIG. 2, after the NN kernel has been initially trained 204 and implemented 206 in a radio to suppress an artifact under non-edge conditions, and possibly also under one or more known edge conditions, if a new edge condition is encountered 208 the NN kernel can be easily and quickly re-optimized for artifact suppression under the newly-encountered edge condition.

All that is needed is to collect or generate training examples 210 under the new edge condition, and apply the new examples 212 to the NN kernel 300 as additional training. For example, theoretically generated re-training examples that include the newly encountered edge condition can be generated using one or more neural networks, for example using a generative adversarial network "GAN." Because the additional training of the NN kernel 300 represents only an adjustment to the previously learned solution, and is not a training "from scratch," the additional training 212 requires fewer examples than the original training, and in embodiments can be performed in "real time" using actual signals as received by the radio, rather than using theoretically generated examples. If real examples are used for training, the CBER of a received signal can be estimated based on expected reference symbols, checksums, and/or other error detection features that enable the radio to determine whether a given group of symbols has been received successfully.

Figure 5:
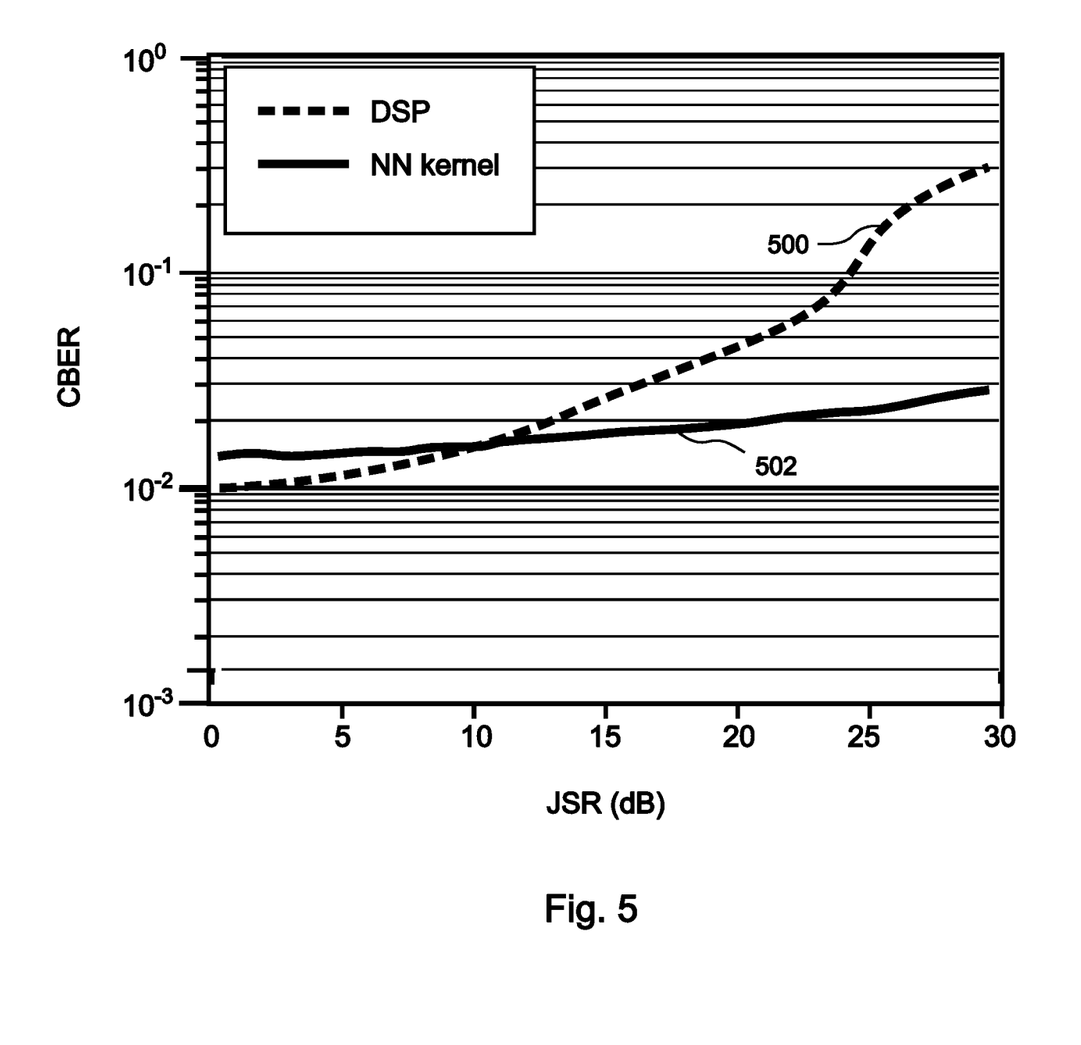
FIG. 5 is a chart that compares artifact suppression of a conventional DSP with artifact suppression of a NN kernel under non-edge conditions, according to a de-noise embodiment of the present disclosure.

FIG. 5 compares the performance 502 of the de-noise NN kernel 300 of FIG. 3A, after training, with the performance 500 of a DSP under non-edge (single tone) conditions as a function of the JSR. In the example of FIG. 5, the DSP algorithm is optimized for single tone noise suppression, and is intended for deployment under conditions where only single tone noise interference is expected. It can be seen that the performance 502 of the NN kernel exceeds the performance 500 of the DSP when the JSR exceeds a factor of 10. In embodiments, improved performance of the NN kernel is achieved under some non-edge conditions because the artifact suppression of the NN kernel is not based on an approximate, theoretical model of the artifact, but instead is based on realistic examples of the artifact. The NN kernel is thereby able to take into account nuances and subtle features of the artifact that may not even be known to the designers of the DSP, nor to the designers of the NN kernel. In FIG. 5, these "subtle" features of the tone noise become more significant as the JSR increases, which explains the increasing advantage of the NN kernel 502 over the DSP 500 as the JSR is increased beyond 10.

Figure 6:
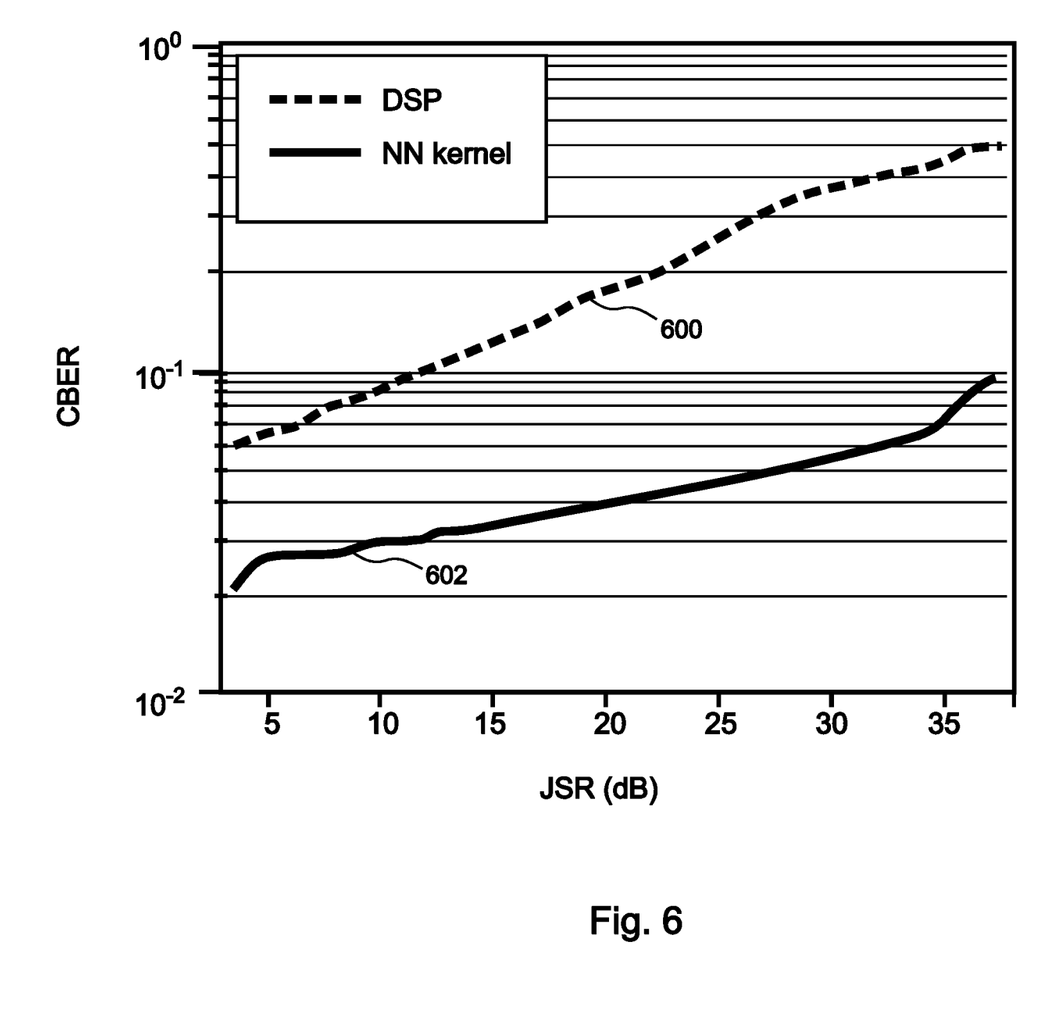
FIG. 6 is a chart that compares artifact suppression of a conventional DSP and the NN kernel of FIG. 5 under an edge condition, according to a de-noise embodiment of the present disclosure.

FIG. 6 compares the performance of the NN kernel and DSP of FIG. 5 under the edge condition of two-tone interference. It can be seen in the figure that the performance 602 of the NN kernel is significantly better than the performance 600 of the DSP under the full range of JSR values. The illustrated example assumes that the training of the NN kernel has been updated using examples of two-tone interference, while the DSP remains optimized only for single tone interference. This comparison is realistic because, upon encountering a new edge condition, the NN kernel would be easily updated by additional training, possibly in real time, without changing the computational footprint of the NN kernel, whereas upgrading or replacing the DSP would be difficult and time consuming, would require a larger computational footprint, and would be virtually impossible in real time. Accordingly, in the case of DSP artifact suppression, a new edge condition, when first encountered, would still be addressed by a DSP that was only intended for non-edge conditions.

Figure 7:
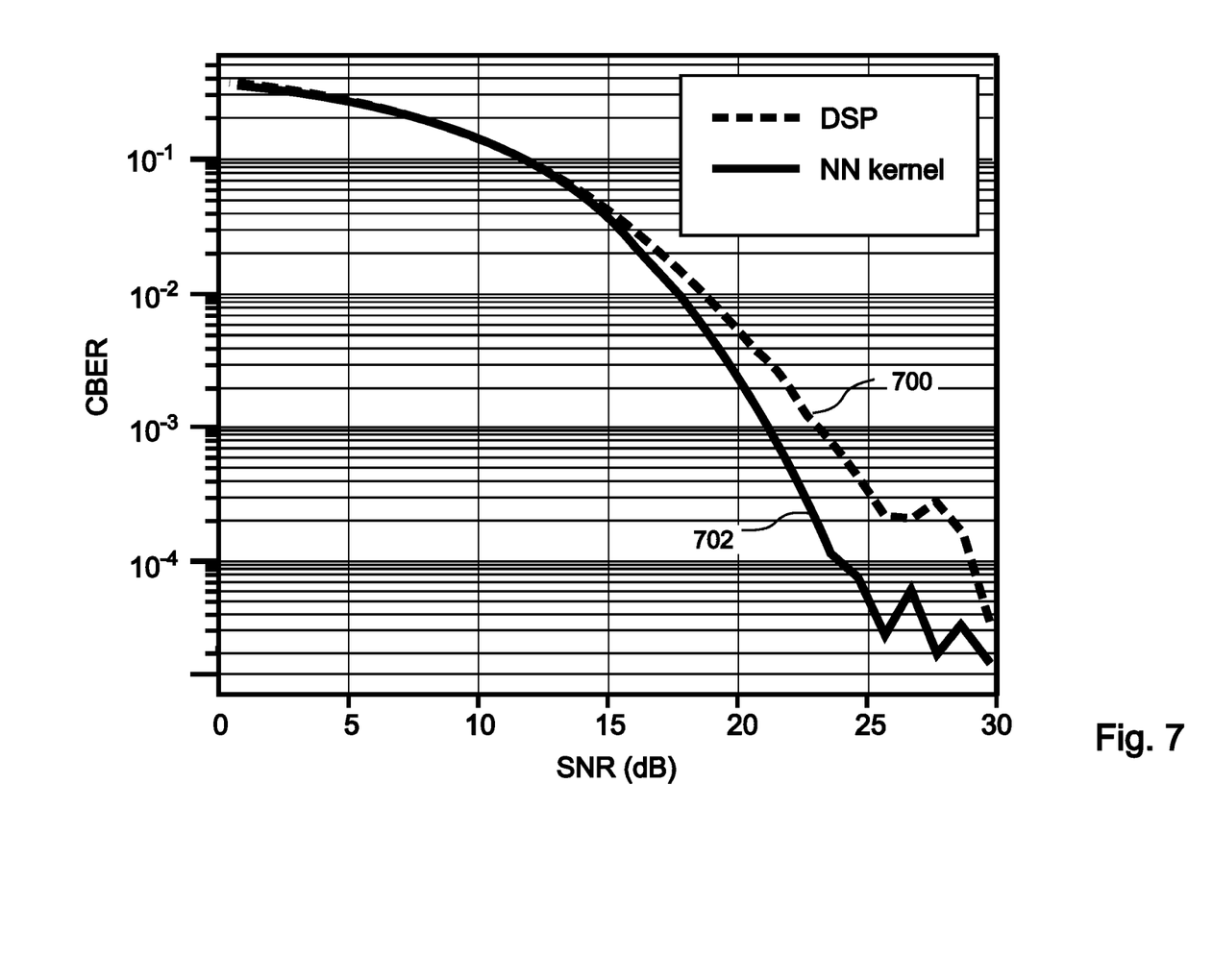
FIG. 7 is a chart that compares artifact suppression of a conventional DSP with artifact suppression of a NN kernel under non-edge conditions, according to a modem embodiment of the present disclosure.

FIG. 7 compares the performance 702 of the modem NN kernel 300 of FIG. 3B, after training, with the performance 700 as a function of the SNR of a DSP under the non-edge condition of less than 200 Hz frequency. It can be seen that the performance of the NN kernel 702 is comparable to the performance of the DSP 700 for SNR values less than about 15 dB, and superior to the DSP for SNR values above 15 dB.

Figure 8:
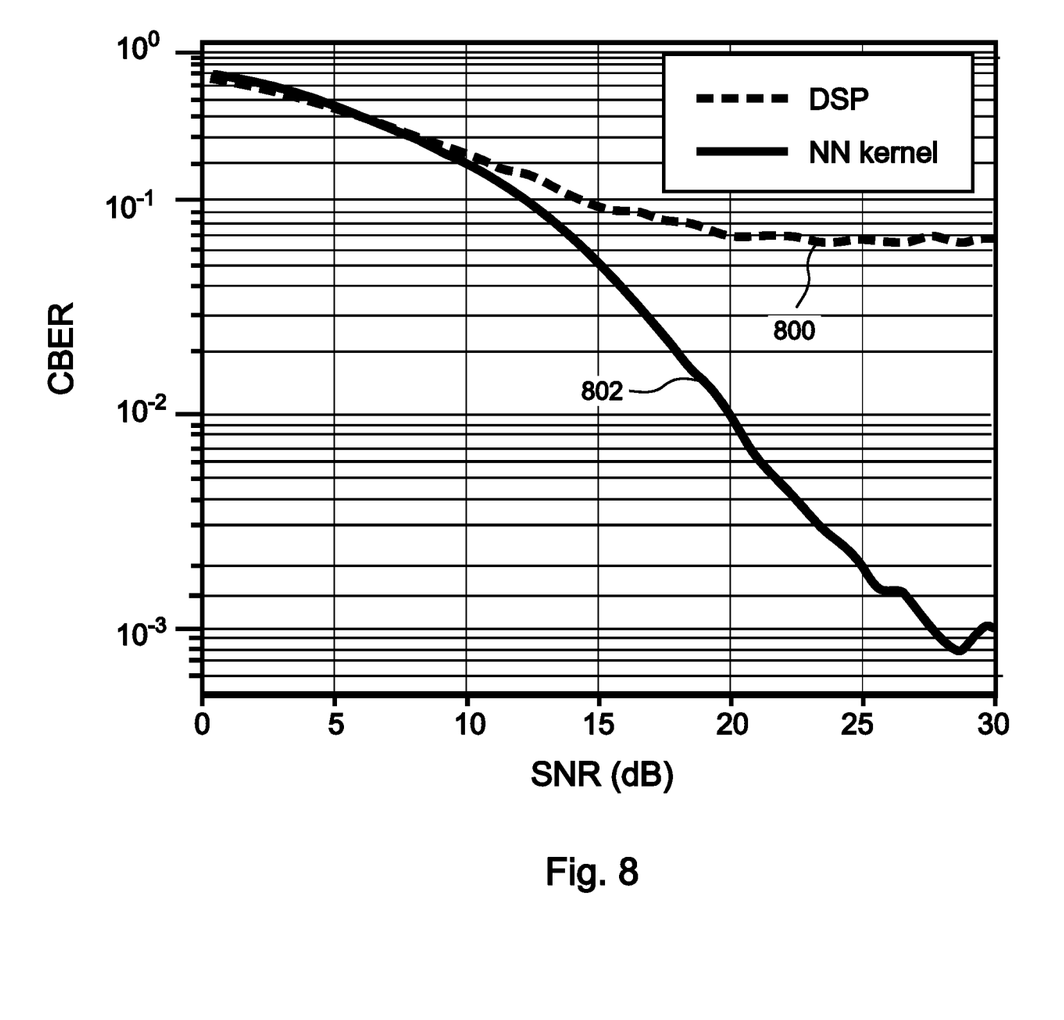
FIG. 8 is a chart that compares artifact suppression of a conventional DSP and the NN kernel of FIG. 7 under an edge condition, according to a modem embodiment of the present disclosure.

FIG. 8 compares the performance of the NN kernel and DSP of FIG. 7 under the edge condition of up to 5 kHz frequency offsets. It can be seen in the figure that the performance 802 of the NN kernel is comparable to the performance of the DSP 800 for SNR values less than about 12 dB, and significantly better than the DSP for SNR values above 12 dB. The illustrated example assumes that the training of the NN kernel has been updated using examples of frequency offsets greater than 200 Hz and up to 5 kHz, while the DSP remains optimized only for frequency offsets of less than 200 Hz. This comparison is realistic because, upon encountering a new edge condition, the NN kernel would be easily updated by additional training, possibly in real time, without changing the computational footprint or latency of the NN kernel, whereas upgrading or replacing the DSP would be difficult and time consuming, would require a larger computational footprint and latency, and would be virtually impossible in real time. Accordingly, in the case of DSP artifact suppression, a new edge condition, when first encountered, would still be addressed by a DSP that was only intended for non-edge conditions.

In both FIG. 7 and FIG. 8, time offsets are limited to be less than 10 us.

In some embodiments, the training of at least one of the NN kernels 300 is updated periodically or continuously during operation of the radio by using received signals as the training examples. In this way, the NN kernels 300 can be automatically optimized, continuously or pseudo-continuously, to whatever conditions are encountered.

Example 1: De-Noise NN Kernel

A de-noise DSP, as included in many radios, including radios operating according to the LTE protocol, removes tone interference from the received time-domain signal. A traditional DSP solution to tone interference removal is through the implementation of a notch filter by the DSP. The notch frequency is selected using an oversampled fast Fourier transform (FFT) of the received signal by picking the frequency with the largest magnitude, under an assumption that the tone noise is a single frequency noise and is the dominant term. A notch filter is then applied to the received signal to remove all of the received RF energy that is received at the frequency of the tone interference. In the process, the signal itself is also necessarily distorted at and near that frequency.

If the tone interference becomes more complicated, such as including multiple tones or being a tone that drifts in frequency, the traditional de-noise DSP approach is to implement increasingly more complex algorithms and assumptions. The number of interferers must be estimated, which enforces an assumption on how far apart or how strong the interfering tones may be. Finally, removing multiple frequencies further distorts the signal at the interferer frequencies.

Embodiments of the present disclosure implement tone interference suppression by preparing a NN kernel having Dilated Causal Convolutions (DCC) layers 302 as illustrated in FIG. 3A that improve the receptive field of higher "dense" layers 304 in the NN kernel, without greatly increasing the number of parameters in the model.

With reference again to FIG. 3A, in Example 1 the input 320 to the NN kernel 300 is the signal with interference, and the desired output 336 is the signal with interference removed. Each input sequence includes the complex "IQ" values of a single LTE packet, normalized to have a maximum magnitude of 1.

The NN kernel is trained using a Mean Squared Error (MSE) loss using training example signals having a range of Signal to Noise Ratio (SNR) values and Jammer to Signal Ratio (JSR) values, as well as randomly selected in-band tone frequencies. Since the interference is confined to narrow frequency bands, a complex Fourier Transform (FFT) 314 is applied to the input sequence 320 before suppression of the tone interference, and an Inverse complex Fast Fourier Transform (IFFT) 334 is applied to the sequence after tone interference suppression. This forces the NN kernel 300 to explicitly learn how to remove interference in the frequency domain, with the goal of having the NN kernel 300 introduce less distortion than a notch filter.

The NN kernel in Example 1 includes a plurality of two-dimensional DCC layers 302 that are stacked as shown in FIG. 3A until the receptive field covers the length of the entire input sequence. The DCC2D layers 304 are interconnected both by skip connections 328 and by residual connections 330 so that all of the DCC2D layers 302 can benefit from the data received by all of the other DCC2D layers 302. In particular, the residual connections 330 enable the DCC2D layers 302 to learn novel features from other DCC2D layers 302 that are not immediately preceding, thereby enabling recognition of new aspects of the data that have not yet been captured. In addition, the residual connections 330 increase the efficacy and efficiency of the training of the neural network(s) and weight updates. The skip connections 328 serve to combine features from different sized receptive fields, thereby providing an empirical method to control the receptive field size, which allows the NN kernel to adapt as needed according to the type of artifact that is encountered.

The output of the DCC2D layers is then processed by dense layers 332 before the complex inverse Fourier transform is applied 334. In the illustrated embodiment, the NN kernel applies a single neural network to the input data, and thereby implements a single-step process that receives raw signal data as the input and produces output signal data in which noise artifacts have been suppressed. In other embodiments, the NN kernel implements a multi-step architecture. For example, in some de-noise embodiments the NN kernel implements a first step in which the number, frequencies, amplitudes, and widths of the interfering tones are estimated, after which these artifacts are suppressed in a second step. Typically, at least the first step will be performed by one or more neural networks. The second step can also be implemented by one or more neural networks, or by another functionality such as a DSP.

Example 2: Modem NN Kernel

A "modem" DSP, as included in many radios, including radios operating according to the LTE protocol, removes time and frequency offsets from the received time-domain signal to achieve synchronization. When the frequency offsets are small, the traditional DSP solution is a simple cross-correlation of an unsynchronized reference symbol with an expected reference symbol to identify time offsets. When the frequency offsets are large, a more complex Cross Ambiguity Function (CAF) is used by the DSP to exhaustively find the mostly likely time and frequency offsets. To speed up this CAF approach, larger bin sizes can be selected, but that approach results in less accurate offset estimates. The estimated offset accuracy is further reduced in traditional DSPs if the chosen CAF operating bounds are smaller than actual signal offsets. If the signal offsets are beyond the range of what the CAF algorithm assumes, then it is likely that the estimated offsets will be far from the correct values. However, increasing the range of offsets considered by the CAF approach significantly increases the computational complexity of the algorithm.

With reference to FIG. 3B, embodiments of the present disclosure implement a modem NN kernel that concurrently estimates the time and frequency offsets of a reference symbol 308 in the received signal. The NN kernel architecture includes two branches 310, 312, which process the data in time 310 and frequency 312 representations respectively. The time offset branch 310 is connected directly to the unsynchronized reference symbol 308 with several dense layers 304, while the frequency offset branch 312 is connected to the unsynchronized reference symbol 308 after FFT preprocessing 314 through a similar set of dense layers 304. As in the de-noise NN kernel of Example 1, the IQ inputs of the received reference symbol 308 are normalized to have a maximum magnitude of 1. The NN kernel is trained using examples having a range of time and frequency offsets using a mean square error (MSE) loss. The outputs of the NN kernel in the illustrated embodiment are the estimated time and frequency offsets. Synchronization of the signal is then achieved by time shifting the signal according to the estimated time offset and multiplying the signal by a complex exponential that removes the estimated frequency offset.

In the illustrated example, the time 316 and frequency 318 offsets are estimated in two parallel steps, and the synchronization is then applied as a third step. A separate neural network can be assigned to each of these three steps, or one or two of the three steps can be implemented by a DSP or other mechanism. For example, the estimation of the time and frequency offsets can be performed by two neural networks working in parallel, after which a DSP performs the synchronization based on the neural network estimates.

The foregoing description of the embodiments of the disclosure has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the disclosure to the precise form disclosed. Many modifications and variations are possible in light of this disclosure.

Although the present application is shown in a limited number of forms, the scope of the disclosure is not limited to just these forms, but is amenable to various changes and modifications. The disclosure presented herein does not explicitly disclose all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

What is claimed is:

1. A method of enhancing the adaptability of a radio to suppress a target artifact that is present under a first novel edge condition in a signal received by the radio, wherein said signal carries a desired message to be decoded by the radio, the method comprising:
   implementing a neural network architecture comprising at least one neural network in a neural network kernel (NN kernel);
   preparing a plurality of training examples that include the target artifact under the first novel edge condition;
   training the neural networks of the NN kernel using the training examples; and
   implementing the NN kernel in the radio in replacement of a DSP of the radio that is configured to suppress the target artifact in the absence of the first novel edge condition, thereby causing the NN kernel to suppress the target artifact during operation of the radio under the first novel edge condition.

2. The method of claim 1, wherein the neural network kernel architecture comprises at least one Dilated Causal Convolutions (DCC) layer.

3. The method of claim 2, wherein at least one of the DCC layers is a two-dimensional DCC layer.

4. The method of claim 2, wherein the neural network architecture includes sufficient DCC layers to provide a receptive field that covers a length of an entire input sequence of message symbols.

5. The method of claim 1, wherein the neural network kernel architecture comprises a plurality of dense layers.

6. The method of claim 1, wherein the training examples are artificially generated, and wherein each of the training examples includes the target artifact as the only artifact of the training example.

7. The method of claim 1, wherein the training examples are artificially generated by a neural network.

8. The method of claim 7, wherein the training examples are artificially generated by a Generative Adversarial Network (GAN).

9. The method of claim 1, wherein the training examples include fewer than 2500 training examples.

10. The method of claim 1, wherein the neural network kernel is implemented in a field programmable gate array (FPGA) or an application specific integrated circuit (ASIC).

11. The method of claim 10, wherein the FPGA or ASIC can be directly installed in the radio in replacement of the DSP.

12. The method of claim 1, wherein the NN kernel provides enhanced suppression of the target artifact as compared to the DSP under at least some non-edge conditions.

13. The method of claim 1, wherein a computational size of the NN kernel is approximately equal to a computational size of the DSP.

14. The method of claim 1, further comprising, upon encountering the target artifact under a second novel edge condition, where the second novel edge condition was not included in the training examples that were used to train the neural networks of the NN kernel:
   generating a plurality of retraining examples that include the target artifact under the second edge condition;
   performing additional training of at least one of the neural networks in the NN kernel using the retraining examples; and
   upon completion of said additional training, deploying the NN kernel to suppress the target artifact under the second novel edge condition.

15. The method of claim 14, wherein adaptation of the DSP to the second novel edge condition would require increasing a computational size of the DSP, and wherein said retraining does not require a computational size of the NN kernel to be increased.

16. The method of claim 1, wherein suppression of the target artifact by the NN kernel includes application of a plurality of suppression steps.

17. The method of claim 16, wherein the neural network architecture comprises a plurality of neural networks, at least one of which is dedicated to one of the suppression steps.

18. The method of claim 1, wherein the target artifact comprises at least one of a time offset and a frequency offset of the signal received by the radio.

19. The method of claim 18, wherein the NN kernel comprises separate branches directed to correcting the time offset and the frequency offset.

20. The method of claim 1, wherein the target artifact is tone interference present in the signal received by the radio.

21. The method of claim 1, wherein the desired message is encoded in the received signal by a radio using Orthogonal Frequency Division Multiplexing (OFDM).

22. The method of claim 1, wherein suppression of the target artifact by the NN kernel includes estimating parameters of the target artifact, and then eliminating the target artifact from the received signal.

23. Non-transient media containing instructions readable by a processor and configured to cause the processor to create a Neural Network kernel (NN kernel) operable in a radio to suppress a target artifact that is present in a signal received by the radio under a novel edge condition, wherein said signal carries a desired message to be decoded by the radio, the NN kernel being implemented in the radio in direct replacement of a target artifact suppressing digital signal processor.

* * * * *